US006954202B2

(12) United States Patent　　(10) Patent No.: US 6,954,202 B2
Han et al.　　(45) Date of Patent: Oct. 11, 2005

(54) IMAGE-BASED METHODS OF REPRESENTATION AND RENDERING OF THREE-DIMENSIONAL OBJECT AND ANIMATED THREE-DIMENSIONAL OBJECT

(75) Inventors: Mahn-jin Han, Kyungki-do (KR); Alexey Ignatenko, Moscow (RU)

(73) Assignee: Samsung Electronics Co., Ltd., Suwon (KR)

( * ) Notice: Subject to any disclaimer, the term of this patent is extended or adjusted under 35 U.S.C. 154(b) by 266 days.

(21) Appl. No.: 10/178,548

(22) Filed: Jun. 25, 2002

(65) Prior Publication Data

US 2003/0001838 A1 Jan. 2, 2003

(30) Foreign Application Priority Data

Jun. 29, 2001　(RU) ........................................ 2001118221

(51) Int. Cl.$^7$ ............................................. G06T 15/00
(52) U.S. Cl. ...................... 345/419; 345/427; 345/424; 345/629; 345/583; 345/420; 345/422
(58) Field of Search ................................ 345/419, 420, 345/421, 422, 423, 582, 473, 629, 424, 427, 428, 587, 426, 583; 382/141

(56) References Cited

U.S. PATENT DOCUMENTS 5,774,572 A　*　6/1998　Caspi .......................... 382/141
6,424,351 B1　*　7/2002　Bishop et al. ............... 345/582

OTHER PUBLICATIONS

Duan et al. "Compression of the Layered Depth Image", IEEE published Apr. 2001; pp. 331–340.*
Manuel M. Oliveira et al., "Relief Texture Mapping", Proceedings of SIGGRAPH 00, 10 pp.
Jonathan Shade et al., "Layered Depth Images", Proceedings of SIGGRAPH 1998, pp. 231–242.
Chun–Fa Chang et al., "LDI Tree: A Hierarchical Representation for Image–Based Rendering", Proceedings of SIGGRAPH 1999, pp. 291–298.
Szymon Rusinkiewicz et al., "QSplat: A Multiresolution Point Rendering System for Large Meshes", Proceedings of SIGGRAPH 2000, pp. 1–10.
Hanspeter Pfister et al., "Surfels: Surface Elements as Rendering Primitives", Proceedings of SIGGRAPH 2000, 8 pp.
Bradford Chamberlain et al., "Fast Rendering of Complex Environments Using a Spatial Hierarchy", Proceedings of Graphics Interface 1996, 9 pp.
J. P. Grossman, "Point Sample Rendering", Proceedings of Eurographics Workshops on Rendering Techniques 1998, pp. 1–57.
Dani Lischinski et al., "Image–Based Rendering for Non–Diffuse Synthetic Scenes", Proceedings of Eurographics Workshops on Rendering Techniques 1998, 14 pp.

(Continued)

*Primary Examiner*—Kimbinh T. Nguyen
(74) *Attorney, Agent, or Firm*—Buchanan Ingersoll PC

(57) ABSTRACT

Provided are three-dimensional still and animated object representations obtained from photos of real-life objects and their geometrical representations, allowing compact storage, fast rendering with high output image quality, suitable for animation purposes. The method includes transforming original data of a three-dimensional object into an intermediate representation; transforming data of the intermediate representation into a rendering representation in the form of a circumscribing cube, where a layered depth image is attributed to each face of the circumscribing cube, and rendering the obtained representation by determining visible faces of the circumscribing cube with account of the viewer's position, transforming the layered depth image for each of the visible faces into a texture, and visualizing the visible faces with texture.

16 Claims, 4 Drawing Sheets

OTHER PUBLICATIONS

M. Levoy et al., "The Use of Points as Display Primitive", Technical Report TR 85–022, The University of North Carolina at Chapel Hill, Department of Computer Science, 1985, pp. 1–19.

L. Westover, "Footprint Evaluation for Volume Rendering", Proceedings of SIGGRAPH 1990, pp. 367–376.

C. I. Connolly, "Cumulative Generation of Octree Models from Range Data", Proceedings of Intel. Conf. Robotics, pp. 25–32, Mar. 1984.

G.H Tarbox et al., "IVIS: An Integrated Volumetric Inspection System", Proceedings of the 1994 Second CAD–Based Vision Workshop, pp. 220–227, Feb. 1994.

B. Curless et al., "A Volumetric Method for Building Complex Models from Range Images", Proceedings of SIGGRAPH 1996, pp. 1–10.

C. Bregler, "Video Based Animation Techniques for Human Motion", SIGGRAPH '00 Course 39: Image–based Modeling and Rendering, pp. 7–1 to 7–3.

Paul F. Debevec et al., "Modeling and Rendering Architecture from Photographs: A Hybrid Geometry–and Image–based Approach", Proceedings of SIGGRAPH 1996, pp. 1–33.

Oliveira et al., "Image–Based Objects", Proceedings of the 1999 Symposium On Interactive 3D Graphics, Atlanta, GA, Apr. 26–28, 1999, pp. 191–197, XP –001032570.

Shade et al., "Layered Depth Images", Computer Graphics, Siggraph 98 Conference Proceedings, Orlando, FL, Jul. 19–24, 1998, pp. 231–242, XP002270434.

Duan, et al., "Compression of the Layered Depth Image", Data Compression Conference, Proceedings, DCC, IEEE Computer Society Press, Los Alamitos, CA, Mar. 27, 2001, pp. 331–340, XP001089854,.

Popescu et al., "Efficient Warping for Architectural Walk-throughs Using Layered Depth Images", Visualization '98, Proceedings Research, Triangle Park, NC, Oct. 18–23, 1998, pp. 211–215, XP010321061.

* cited by examiner

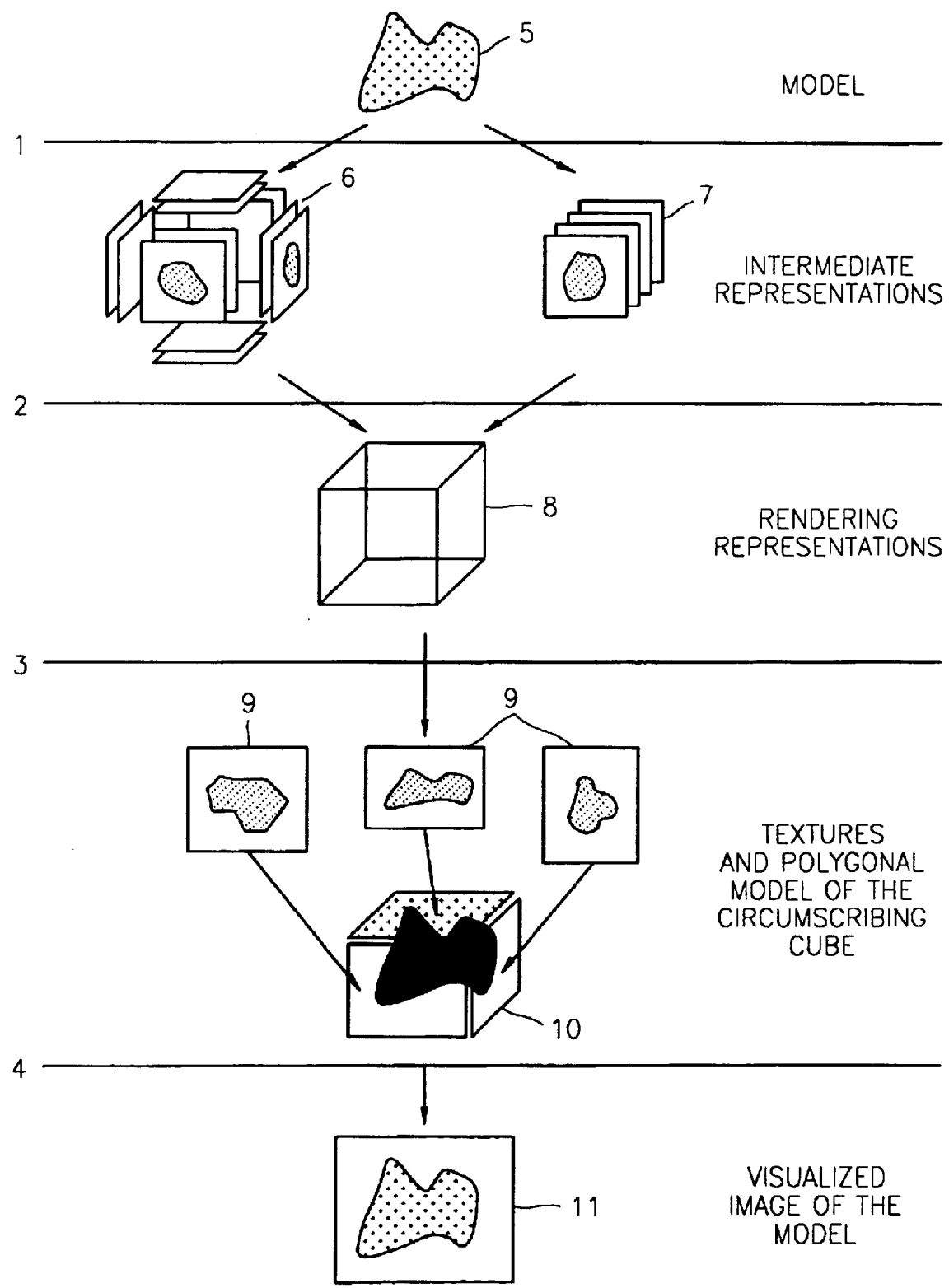

IMAGE-BASED METHODS OF REPRESENTATION AND RENDERING OF THREE-DIMENSIONAL OBJECT AND ANIMATED THREE-DIMENSIONAL OBJECT

Priority is claimed to Patent Application Number 2001118221 filed in Russia on Jun. 29, 2001, herein incorporated by reference.

BACKGROUND OF THE INVENTION

1. Field of the Invention

The present invention relates to computer graphics and more specifically to a three-dimensional (3D) still and animated object representations obtained from photos of real-life objects and their geometrical representations, and to a representation and rendering method using a simplified geometrical model of an object.

2. Description of the Related Art

In the immediate future, high-quality rendering of 3D objects at interactive speed will receive the primary emphasis in modern graphic systems. The demand for high-quality rendering of 3D objects necessitates effective algorithms to be devised for compressing the objects and transmitting them via communications networks in such fields as electronic commerce, computer games, science, engineering, medicine. Use of traditional polygonal models of 3D objects during the last tens of years to simultaneously meet all these demands has failed to give the desired result. Polygonal models have two major shortcomings: large volume (e.g., realistic models require tens of million triangles) and difficulty of constructing. To overcome these difficulties, several approaches to 3D graphics have been suggested in recent years. The most advantageous of them seem to be methods based on images of objects, and methods based on points instead of triangles in 3D space.

Image-based methods represent the given object as a set of images—'photos' of the object—totally covering its visible surface, and taken from several different camera positions. Besides, each such image is accompanied with corresponding depth-map which is an array of distances from the pixels in the image plane to the object surface. An advantage of such a representation is that reference images can provide high quality of the object visualization regardless of its polygonal model complexity, and can be compressed by usual image compression techniques without sacrificing much quality. In addition, rendering time is proportional to the number of pixels in the reference and output images and not the object complexity.

Disadvantages are due to the fact that obtaining depth maps for real life objects (e.g., sculptures) is rather complicated operation, as well as to insufficiently developed techniques of handling such representations.

Point-based methods represent an object as a points cloud' without imposing explicit local polygonal structure. In this method, a set of depth images defines a set of points (having corresponding colors) on the object surface by translating each pixel of each reference image by the corresponding depth value in the direction orthogonal to the image plane. Hence image-based representations are a particular case of point-based representations. In the following we shall concentrate on image-based representations as they are closer to our approach.

In the literature, the two aforementioned trends are described in references [1] to [13] describing such 3D object representation and rendering methods, as Relief Textures Mapping [1], Layered Depth Images [2], Layered Depth Image Tree [3], Qsplat [4], Surfels [5] and some other that have been known in prior art. In the following discussion of the prior art approaches, references will be made to the following publications:

[1] Manuel M. Oliveira, Gary Bishop, David McAllister. Relief Textures Mapping, Proceedings of SIGGRAPH '00;

[2] Jonathan Shade, Steven Gortler, Li-wei He, Richard Szeliski, Layered Depth Images, Proceedings of SIGGRAPH '98;

[3] Chun-Fa Chang, Gary Bishop, Anselmo Lastra. LDI Tree: A Hierarchical Representation for Image-Based Rendering, Proceedings of SIGGRAPH '99;

[4] Szymon Rusinkiewicz, Marc Levoy. QSplat: A Multiresolution Point Rendering System for Large Meshes, Proceedings of SIGGRAPH '00;

[5] Hanspeter Pfister, Matthias Zwicker, Jeroen van Baar, Markus Gross. Surfels: Surface Elements as Rendering Primitives, Proceedings of SIGGRAPH '00;

[6] Chamberlain et al., Fast Rendering of Complex Environments Using a Spatial Hierarchy, Proceedings of Graphics Interface '96;

[7] Grossman and Daily, Point sample rendering, Proceedings of Eurographics Workshops on Rendering Techniques '98;

[8] Lischinski and Rappoport, Image-Based Rendering for Non-Diffuse Synthetic Scenes, Proceedings of Eurographics Workshops on Rendering Techinques '98;

[9] M. Levoy and T. Whitted, The Use of Points as Display Primitives. Technical Report TR 85-022, The University of North Carolina at Chapel Hill, Department of Computer Science, 1985;

[10] L. Westover, Footprint Evaluation for Volume Rendering, Proceedings of SIGGRAPH '90;

[11] C. I. Connolly. Cumulative Generation of Octree Models from Range Data, Proceedings of Intl. Conf. Robotics, pp. 25–32, March 1984;

[12] G. H Tarbox and S. N. Gottschlich. IVIS: An Integrated Volumetric Inspection System, Proceedings of the 1994 Second CAD-Based Vision Workshop, pp. 220–227, February 1994;

[13] Curless, B., Levoy, M., A Volumetric Method for Building Complex Models from Range Images, Proceedings of SIGGRAPH '96;

[14] C. Bregler, Video Based Animation Techniques for Human Motion, SIGGRAPH '00 Course 39: Image-based Modeling and Rendering; and

[15] Paul F. Debevec, Camillo J. Taylor, Jitendra Malik, Modeling and Rendering Architecture from Photographs: A Hybrid Geometry-and Image-based Approach, Proceedings of SIGGRAPH '96.

The common problem with image-based methods is occurrence of holes in the resulting image. Unlike polygonal models that are 'continuous' in the sense that the object surface is linearly interpolated into the interior of all the polygons (normally, triangles), image-based and point-based representations provide 'discrete' approximations of the object. In case of image-based representations, object surface is, in fact, approximated with small colored squares, i.e. shifted pixels of reference images. When viewing direction differs substantially from the normal direction to each of the reference image planes, projections of the approximating squares generally do not completely cover the projection of the object surface. Let as call such holes the holes of the first type. Another source of holes in the resulting image for image-based representations is the fact that some parts of the surface may be not visible in all of the reference images, but become visible for some viewpoints (holes of the second type). These holes are due to insufficient information contained in a particular image-based representation.

Relief texture method [1] suppresses holes of the first type by using an analog of linear interpolation, which may lead to distortions and artifacts, since interpolation is performed in the 2-dimensional projection of the object rather than in 3D space.

More importantly, holes of the second type can only be treated the same way under this approach.

Layered depth images (LDI) [2] are data structure designed to avoid the problem with holes of the second type. LDI is an image whose pixels contain all the object points projecting to a fixed location in the reference image plane. Fast prewarping algorithm of [1] applies here as well. However, problems with holes of the first type remain. Splatting (first introduced in [10]) is used to solve the problem of holes of the first type. Splat is a small two-dimensional rectilinear or elliptical surface patch endowed with a certain color distribution—e.g. Gaussian centered at the center of the patch, or constant. Disadvantage of the LDI method is in its nonsymmetry since the representation is based on a projection in a certain fixed direction. This leads to difficulties with hole filling for viewing directions that are very different from said fixed direction.

LDI tree [3] is an octree with an LDI attached to each octree cell (node). The advantage of having a hierarchical model is that not every LDI in the octree should be rendered. Those cells that are farther away are rendered in less detail by using the filtered points that are stored in the LDIs higher in the hierarchy. This representation was devised in order to overcome the nonsymmetry of LDI by using many reference images. However, the storage space becomes very large: LDI tree for 512-by-512 image (obtained from 36 reference images) occupies 30 Mbytes as reported in [3], and about half this amount was the tree structure itself. As reported in [3], rendering time for this object is also large: 2–3 seconds per frame on Silicon Graphics Onyx2 with 32250 MHz MIPS R10000 processors (although parallelism was not used).

Yet another representation combining image-based data into a tree structure is recently designed Surfels method [5]. It deals with a specific tree [8] that is a layered-depth cube (LDC) where instead of a single LDI tree, nodes contain three LDI's corresponding to three orthogonal planes. Results reported in [5] were obtained for original model containing 81000 triangles. Frame rate of 11 frames per second (fps) for 256-by-256 output buffer was obtained on Pentium III 700 MHz processor. Surfels are reference image pixels shifted by a corresponding depth vector. The tree structure is used to speed up computations for choosing visible elements. Hole filling is achieved by nearest-neighbor or Gaussian filtering. Splatting is implemented in this structure. High quality of the resulting image is attained at the cost of data volume and speed restrictions.

Recently introduced representation of Qsplat [4] should also be mentioned, although it is rather point-based than image-based method. This approach uses hierarchical point structure based on nested balls. Elliptical splats of proper size are used at the rendering stage. However somewhat complicated and time-consuming truncated culling was used in [4]. The data structure is also more complex, and requires more time to process.

The idea and various implementation methods for obtaining octree structured 3D model with from range data such as sets of depth images were developed in [1]–[12]. [13] deals with a construction of polygonal model from original data using octree.

All the above relates to still 3D image-based representations. Speaking of animated 3D objects, it should be noted that only very few image-based methods were suggested for this problem so far. In [14] an idea of facial image modification for almost constant 3D face geometry is developed. This is applicable only to a restricted class of animated objects and is not animation of an actual 3D object. In [15] architectural scenes are animated with the aid of view-dependent texture mapping which reconstruct architectural views from various viewpoints on the base of a few photos.

So, it is clear that an image-based representation allowing compact storage, fast rendering with high output image quality, and suitable for animation purposes is needed.

SUMMARY OF THE INVENTION

It is an object of the invention to provide 3D object representations based on depth images, allowing for fast and high quality rendering, in which the above drawbacks are reduced or eliminated.

It is another object of the invention to provide a method for 3D object representations based on depth images, allowing for fast and high-quality rendering and the possibility of using existing hardware-based acceleration means.

A further object of the invention is to provide a method for compact representation of an animated 3D object, enabling fast and correct rendering. One more object of the invention is to provide a method for representation and rendering a three-dimensional object, allowing for fast warping, visualization with the aid of splats of accurately computed size, and culling process allowing to avoid unnecessary computations, thereby increasing the rendering speed. The above result is attained in a method for representation and rendering of a three-dimensional object in accordance with the invention, comprising the steps of: transforming original data of a three-dimensional object into an intermediate representation; transforming data of the intermediate representation into a rendering representation in the form of a circumscribing cube, where a layered depth image is attributed to each face of the circumscribing cube, and rendering the obtained representation by determining visible faces of the circumscribing cube with account of the viewer's position, and transforming the layered depth image for each of the visible faces into a texture, and visualizing the visible faces with texture.

In one embodiment of the method, said transforming of original data of a three-dimensional object into an intermediate representation comprises: placing a three-dimensional model inside the circumscribing cube; orthographically projecting the model onto all the faces of the circumscribing cube so that to obtain, for each face, a model image with a predetermined pixel resolution; computing, for every pixel in the obtained images, a corresponding depth value which is a distance from a point at the model surface to a corresponding face of the circumscribing cube, so that to obtain a gray-scale image for each face, every point of the gray-scale image having brightness corresponding to depth at this point; storing data of the obtained 12 images as 6 pairs of maps, each of the map pairs consisting of a color image and a gray-scale image corresponding to the face of the circumscribing cube; and constructing from the obtained 6 map pairs a layered depth image for every face of the circumscribing cube.

In another embodiment of the method, said transforming of original data of a three-dimensional object into an intermediate representation comprises generating a layered depth image and forming from the layered depth image corresponding multilayer depth images for each face of the circumscribing cube, wherein points of the intermediate images are discarded if an angle between normal at the point and normal to the cube face is smaller than a predetermined value.

The transformation of the layered depth image for each visible face into a texture preferably comprises: determining texture size depending on the viewer's position relative to the face; dividing the face into quadrants by coordinate axes having the origin coinciding with a point which is the orthogonal projection of the viewpoint onto the face plane; determining, for each quadrant, a direction of traversal of the layered depth image by lines in the direction to said origin of coordinates and by depth from the points farthermost from the face plane to closer points, and checking in the process of traversal of the image for each point of the image, whether the point falls within the resulting texture, if the result is negative, ignoring the corresponding image point and passing to the next point, and if the result is affirmative, functionally transforming the coordinates and depth of the image point into coordinates of the point of the resulting texture; and forming a splat at the texture point with the obtained coordinates.

The intermediate representation data is preferably used to store information of the three-dimensional object model.

The above result is also achieved in a method for representation of an animated three-dimensional object in accordance with the invention, comprising the steps of: transforming original data of a three-dimensional object into an intermediate representation; transforming data for frames of the intermediate representation into a rendering representation in the form of a circumscribing cube, where a layered depth image is attributed to each face of the circumscribing cube; and rendering the sequence of the obtained representation by determining, for each frame, visible faces of the circumscribing cube with account of the viewer's position, transforming, for each of the visible faces, the layered depth image into a texture, and visualizing the visible faces with texture.

The obtained intermediate representations in the form of 6 video streams may be compressed using MPEG4 compression format, wherein color information is stored in color channels, and depth maps are stored in alpha-channel.

BRIEF DESCRIPTION OF THE DRAWINGS

The invention will become more readily apparent from the following detailed description of its embodiments with reference to the drawings attached, in which FIG. 1 illustrates a sequence of steps of a method for representation and rendering of a three-dimensional object;

DETAILED DESCRIPTION OF THE INVENTION

Figure 2A:
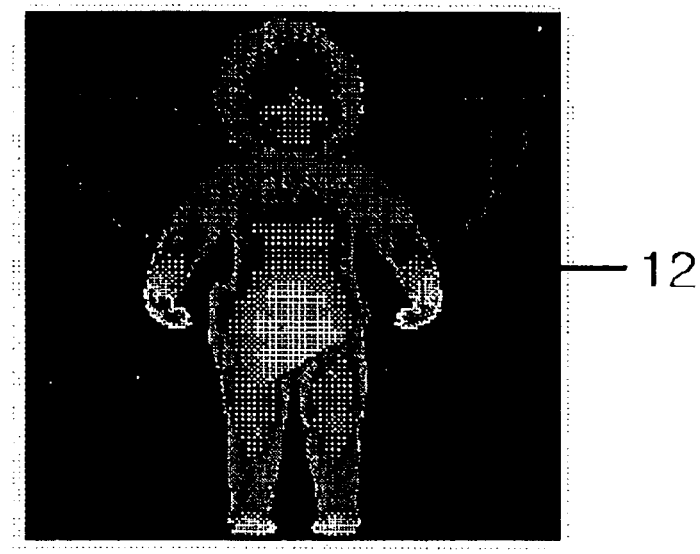
FIG. 2a,b shows an example of a map pair consisting a gray-scale image (a) and color image (b)
Figure 2B:
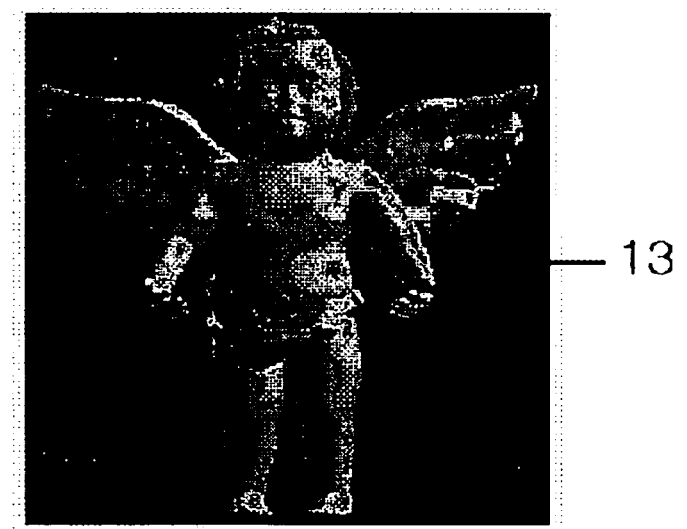

The same elements are denoted by similar reference numerals throughout all the drawings illustrating the invention.

FIG. 1 shows: steps 1 to 4 of a method for representation and rendering of a three-dimensional object; three-dimensional object model 5; intermediate representations 6,7; rendering representation 8; textures 9; polygonal model 10 of the circumscribing cube; visualized image 11 of the model.

FIG. 2a,b shows gray-scale image 12 and color image 13.

Figure 3A:
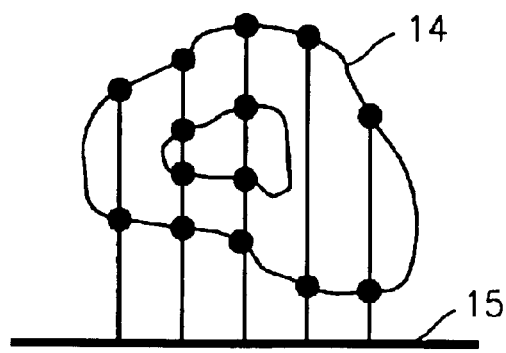
FIG. 3a,b is an example of a layered depth image, where (a) illustrates model projection principle, and (b) illustrates a data structure resulting from the projection.
Figure 3B:
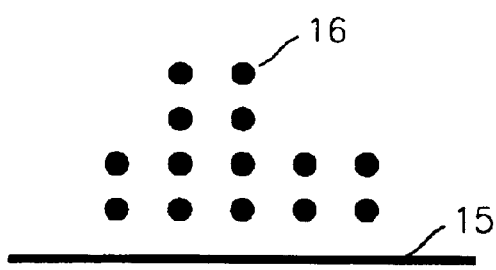

FIG. 3a,b shows: model 14; base plane 15; set 16 of points of a model for each pixel of the layered depth image.

Figure 4:
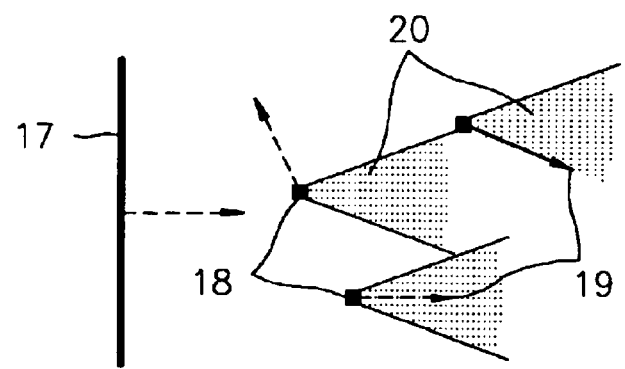
FIG. 4 illustrates checking the intermediate representation points at the step of forming a layered depth image for each face of the circumscribing cube.

FIG. 4 shows: cube face 17; points 18 of rendering representation, normals 19 at points 18; visibility cones 20.

Figure 5:
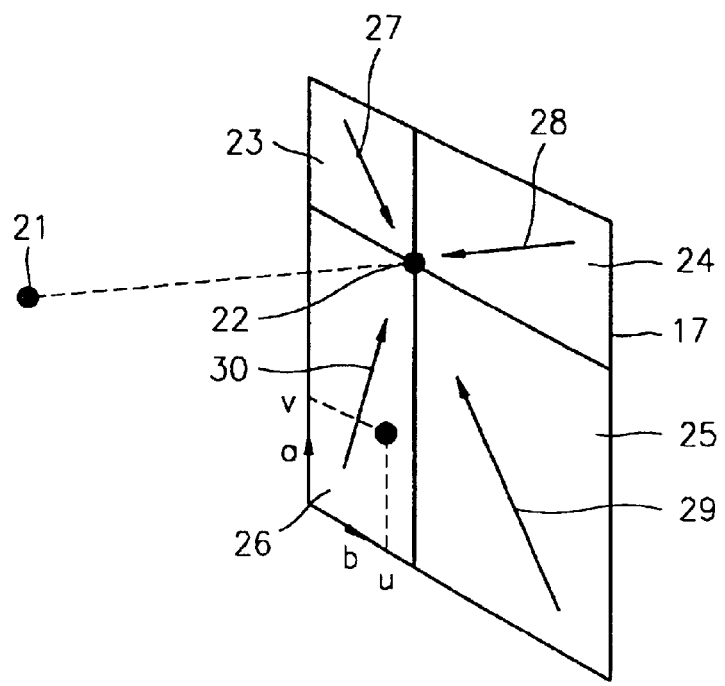
FIG. 5 shows an example of dividing a face of the circumscribing cube into quadrants at the step of transforming each of the visible faces of the multilayer depth image into a texture.

FIG. 5 shows: viewer's position 21; orthogonal projection 22 of the viewer's position point onto face 17; quadrants 23 to 26 of face 17; traversal directions 27 to 30 in each of the face quadrants.

Figure 6A:
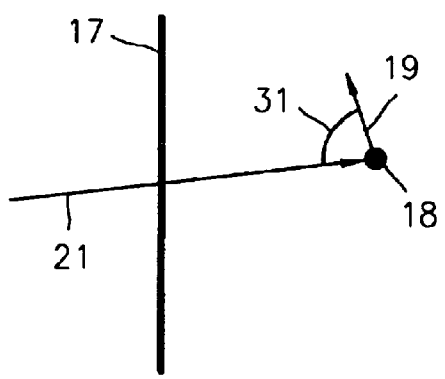
FIG. 6a,b illustrates principles of checking whether every point of the layered depth image falls within the resulting texture: (a) shows checking whether a point is visible for given viewer's position; (b) shows checking whether the points fall within the resulting texture.
Figure 6B:
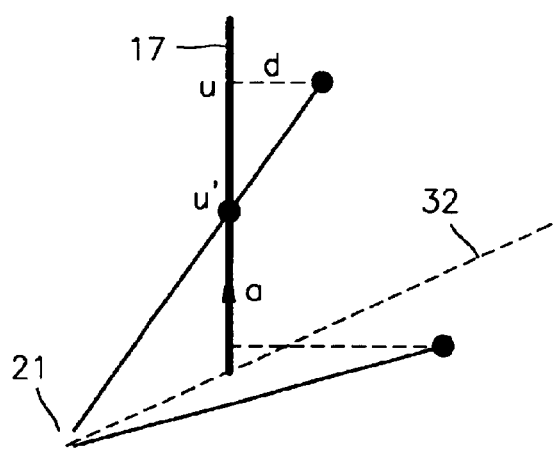

FIG. 6a,b shows: angle 31 between normal 19 at point 18 and direction to point 21; projection 32 of the plane passing through point 21 at which the viewer is located, and the nearest edge of the cube face 17 with respect to the viewer.

Referring now to FIG. 1, a method for representation and rendering of a three-dimensional object is accomplished in the following manner.

At step 1, a model 5 of 3D object is converted into an intermediate representation 6 (7). The intermediate representation may be a set 6 of six pairs of maps, consisting of a gray-scale image 12 and a color image 13 (FIG. 2a,b), or a multilayer depth image 7 (FIG. 3a,b). In the first case, the intermediate representation stores information only of the model surface portion which is visible from the face of the circumscribing cube. Brightness of a point of the gray-scale image 12 (FIG. 2a) is determined by a distance from the face of the circumscribing cube to the model surface. Maximal brightness corresponds to those points on the model surface that lie on the nearest face, while minimal brightness corresponds to the points lying on the opposite face. Image points which do not correspond to points belonging to the model surface are coded by zero brightness value. The second representation (FIG. 3a,b) stores full information of the model 14 surface, since to each pixel of the layered depth image corresponds a set 16 of the model points projecting to the pixel, wherein color and depth of the model surface point and, additionally, the normal to the model surface at this point corresponds to each point in the set 16.

At step 2, a rendering representation is formed as a layered depth image for each face of the circumscribing cube. In case of using the intermediate representation 6, for each face of the circumscribing cube the coordinates of points of the model surface part visible from this face are transformed into the coordinate system associated with another face, the transformation result being added to the depth image corresponding to said face. Using the intermediate representation 7, the layered depth image is transformed into the coordinate system associated with each face.

In process of constructing a layered depth image for each face using the intermediate representation 7, each new added point is checked for potential visibility from this face. As shown in FIG. 4, the point will not be added to the layered depth image for the face if angle 20 between normal 19 at point 18 and normal to point 17 is smaller than a predetermined value.

At step 3, textures are generated that are needed for visualizing by traditional means (step 4). First, visible faces of the circumscribing cube are determined with account of the viewer's current position, then an image is generated for each face, which will be then imposed on the face as a texture. Texture size is determined using the angle between the normal to the face and the vector defined by the viewer's position point and the face center. If the angle is close to zero, the texture size is substantially equal to the original image size. With increasing the angle, the texture size reduces accordingly. The texture size is computed independently for each coordinate u, v.

The texture construction process involves traversal of points of the multilayer depth image corresponding to a face of the circumscribing cube. As shown in FIG. 5, order of the traversal is chosen as follows. Projection of the viewer's position point 21 is found on a face plane of the circumscribing cube. Point 22, corresponding to said projection, divides the face into no more than four quadrants (23,24, 25,26). In each quadrant, direction of traversal of the layered depth image is selected so that points were traversed by lines in directions 27,28,29,30. Then points in each quadrant are traversed in the selected direction, the points with the same coordinates in the face being traversed in order of reducing depth. Each point undergoes a culling process comprising two steps. The first step is performed if normal vectors are present in the layered depth image, and comprises checking the direction of normal to the said point, as shown in FIG. 6a. Angle 31 between the viewing vector and normal 19 at point 18 is determined. If the angle 31 exceeds 90 degrees, the point is ignored, and the process goes to next point. Otherwise, the second test is performed involving removing the points which will not fall within the texture after the functional conversion. For each visible face of the circumscribing cube, two arrays $M_u$ and $M_v$ (indexed by corresponding coordinate (u,v) of the face) are preliminary constructed, the arrays consisting of depths of the points contained within the circumscribing cube and lying on planes passing through two nearest edges of the circumscribing cube face 17 and point 21 where the viewer is located.

FIG. 6a shows projection 32 of one of the planes, corresponding to coordinate u. Array data elements are used as the second culling criterion for points of the layered depth image. If a point depth is greater than $M_u[u]$ or $M_v[v]$ value, where u,v are coordinates of the point in the circumscribing cube face, then the process goes to next point, since this point will not be visible in the resulting texture. Then, one-dimensional functional conversion ('warping', see [1]) is applied to each chosen point, depending on the point coordinates (u,v) and depth d.

The functional conversion gives coordinates (u',v') in the coordinate system associated with the chosen viewer's position 21. The conversions are performed for all points of visible faces. Splat is formed at the point with the obtained coordinates in the generated texture. Color of the splat corresponds to color of the point with original coordinates (u,v,d). Shape of the splat is selected from considerations of speed of imposing in the texture, and usually is square or circle. Size of the splat is determined from the original image size, the obtained texture size, and may be adjusted taking into account the normal at points of the layered depth image.

Coordinates of the splat center should correspond to coordinates (u',v') obtained by the warping. As the result, an image is obtained for each visible face, which image is imposed at step 4 (FIG. 1) on the corresponding face of the polygonal model. Unoccupied areas in the obtained textures are marked as transparent, this ensuring correctness of the resulting image since the cube polygonal model does not cover the background.

A method for representation of an animated object is performed as follows. A circumscribing cube is determined for a model original data stream, i.e. a sequence of animation frames, then six pairs of maps are constructed for each frame, the map pairs consisting of a gray-scale image and a color image as described above with reference to FIGS. 1 and 2a,b. This gives 12 video streams, two video streams per each face of the circumscribing cube. The streams corresponding to color images may be compressed using any algorithm of video stream compression with losses, such as MPEG2. The stream corresponding to gray-scale images (depth maps) should be compressed using a compression algorithm without loss in quality, such as alpha channel compression in MPEG4 format. The preferable embodiment of the method in accordance with the invention provides for compression of six video streams using MPEG4 compression format.

What is claimed is:

1. A method for representation and rendering of a three-dimensional object, comprising the steps of:

transforming original data of a three-dimensional object into an intermediate representation having layered image representations;

transforming data of the intermediate representation into a rendering representation in the form of a circumscribing cube, where a layered depth image is attributed to each face of the circumscribing cube; and rendering the obtained representation by determining visible faces of the circumscribing cube with account of the viewers position, transforming the layered depth image for each of the visible faces into a texture, and visualizing the visible faces with texture.

2. The method according to claim 1, wherein said transforming of original data of three-dimensional object into an intermediate representation comprises:

placing a three-dimensional model inside the circumscribing cube;

orthographically projecting the model onto all the faces of the circumscribing cube so that to obtain, for each face, a model image with a predetermined pixel resolution;

computing, for every pixel in the obtained images, a corresponding depth value which is a distance from a point at the model surface to a corresponding face of the circumscribing cube, so that to obtain a gray-scale image for each face, every point of the gray-scale image having brightness corresponding to depth at this point;

storing data of the obtained 12 images as 6 pairs of maps, each of the map pairs consisting of a color image and gray-scale image corresponding to the face of the circumscribing cube; and constructing from the obtained 6 map pairs a layered depth image for each face of the circumscribing cube.

3. The method according to claim 1, wherein said transforming of original data of a three-dimensional object into an intermediate representation comprises generating a layered depth image and forming from the layered depth image corresponding multilayer depth images for each face of the circumscribing cube.

4. The method according to claim 3, wherein said forming of layered depth images for every face of the circumscribing cube comprises discarding points of the intermediate image, if an angle between normal at the point and normal to the cube face is smaller than a predetermined value.

5. The method according to claim 1, wherein said step of transforming of the layered depth image for each visible face into a texture comprises:

determining texture size depending on the viewer's position relative to the face;

dividing the face into quadrants by coordinate axes having the origin coinciding with a point which is the orthogonal projection of the viewpoint onto the face plane;

determining, for each quadrant, a direction of traversal of the layered depth image by lines in the direction to said origin of coordinates and by depth from points farthermost from the face plane to closer points, and checking in the process of traversal of the image for each point of the image whether the point falls within the resulting texture, if the result is negative, ignoring the corresponding point and passing to the next image point, and if the result is affirmative, functionally transforming the coordinates and depth of the image point into coordinates of the point of the resulting texture; and forming a splat at the texture point with the obtained coordinates.

6. The method according to claim 2, wherein said step of transforming of the layered depth image for each visible face into a texture comprises:

determining texture size depending on the viewer's position relative to the face;

dividing the face into quadrants by coordinate axes having the origin coinciding with a point which is the orthogonal projection of the viewpoint onto the face plane;

determining, for each quadrant, a direction of traversal of the layered depth image by lines in the direction to said origin of coordinates and by depth from points farthermost from the face plane to closer points, and checking in the process of traversal of the image for each point of the image whether the point falls within the resulting texture, if the result is negative, ignoring the corresponding point and passing to the next image point, and if the result is affirmative, functionally transforming the coordinates and depth of the image point into coordinates of the point of the resulting texture; and forming a splat at the texture point with the obtained coordinates.

7. The method according to claim 3, wherein said step of transforming of the layered depth image for each visible face into a texture comprises:

determining texture size depending on the viewers position relative to the face;

dividing the face into quadrants by coordinate axes having the origin coinciding with a point which is the orthogonal projection of the viewpoint onto the face plane;

determining, for each quadrant, a direction of traversal of the layered depth image by lines in the direction to said origin of coordinates and by depth from points farthermost from the face plane to closer points, and checking in the process of traversal of the image for each point of the image whether the point falls within the resulting texture, if the result is negative, ignoring the corresponding point and passing to the next image point, and if the result is affirmative, functionally transforming the coordinates and depth of the image point into coordinates of the point of the resulting texture; and forming a splat at the texture point with the obtained coordinates.

8. The method according to claim 4, wherein said step of transforming of the layered depth image for each visible face into a texture comprises:

determining texture size depending on the viewer's position relative to the face;

dividing the face into quadrants by coordinate axes having the origin coinciding with a point which is the orthogonal projection of the viewpoint onto the face plane;

determining, for each quadrant, a direction of traversal of the layered depth image by lines in the direction to said origin of coordinates and by depth from points farthermost from the face plane to closer points, and checking in the process of traversal of the image for each point of the image whether the point falls within the resulting texture, if the result is negative, ignoring the corresponding point and passing to the next image point, and if the result is affirmative, functionally transforming the coordinates and depth of the image point into coordinates of the point of the resulting texture; and forming a splat at the texture point with the obtained coordinates.

9. The method according to claim 1, wherein said intermediate representation data is used to store information of the three-dimensional object model.

10. The method according to claim 2, wherein said intermediate representation data is used to store information of the three-dimensional object model.

11. The method according to claim 3, wherein said intermediate representation data is used to store information of the three-dimensional object model.

12. The method according to claim 4, wherein said intermediate representation data is used to store information of the three-dimensional object model.

13. The method according to claim 5, wherein said intermediate representation data is used to store information of the three-dimensional object model.

14. A method for representation and rendering of an animated three-dimensional object, comprising the steps of:

transforming original data of a three-dimensional object into an intermediate representation having layered image representations;

transforming data for frames of the intermediate representation into a rendering representation in the form of a circumscribing cube, where a layered depth image is attributed to each face of the circumscribing cube; and rendering the sequence of the obtained representation by determining, for each frame, visible faces of the circumscribing cube with account of the viewer's position, transforming, for each of the visible faces, the layered depth image into a texture, and visualizing the visible faces with texture.

15. The method according to claim 14, wherein said transforming of original data of a three-dimensional object into an intermediate representation comprises:

placing a three-dimensional model inside the circumscribing cube;

for each frame of animation, orthographically projecting the model onto all the faces of the circumscribing cube so that to obtain for each face a model image with a predetermined pixel resolution;

for each pixel in the obtained images, computing a corresponding depth value, which is a distance from a point at the model surface to a corresponding face of the circumscribing cube, so that to obtain for each face a gray-scale image, each point of the gray-scale image having brightness corresponding to depth at this point;

storing data of the obtained 12 images as 6 pairs of maps, each of the map pairs consisting of a color image and gray-scale image corresponding to the face of the circumscribing cube; and constructing from the obtained 6 map pairs a layered depth image for each face of the circumscribing cube.

16. The method according to claim 15, wherein the obtained intermediate representations in the form of six video streams are compressed using MPEG4 compression format, while storing color information in color channels, and depth maps in alpha channel.

* * * * *